(12) United States Patent
Erbe et al.

(10) Patent No.: US 11,278,048 B2
(45) Date of Patent: Mar. 22, 2022

(54) SYSTEM FOR PRINTING AND COOKING A FOOD ITEM

(71) Applicant: BSH HAUSGERAETE GMBH, Munich (DE)

(72) Inventors: Sebastian Erbe, Bretten (DE); Ugur Dogan Guel, Munich (DE); Lucia Schuster, Stuttgart (DE); Alvaro Suarez Iribarne, Barcelona (ES)

(73) Assignee: BSH Hausgeraete GmbH, Munich (DE)

( * ) Notice: Subject to any disclaimer, the term of this patent is extended or adjusted under 35 U.S.C. 154(b) by 713 days.

(21) Appl. No.: 16/302,747

(22) PCT Filed: Apr. 25, 2017

(86) PCT No.: PCT/EP2017/059801
§ 371 (c)(1),
(2) Date: Nov. 19, 2018

(87) PCT Pub. No.: WO2017/198424
PCT Pub. Date: Nov. 23, 2017

(65) Prior Publication Data
US 2019/0313688 A1  Oct. 17, 2019

(30) Foreign Application Priority Data
May 18, 2016 (DE) ...................... 10 2016 208 461.5

(51) Int. Cl.
*A21B 5/00* (2006.01)
*A47J 44/00* (2006.01)
(Continued)

(52) U.S. Cl.
CPC ................. *A23P 20/20* (2016.08); *A23L 5/15* (2016.08); *A23P 30/20* (2016.08); *H05B 6/105* (2013.01);
(Continued)

(58) Field of Classification Search
CPC ......... A21B 5/00; A21B 7/00; A21B 1/42–48; A47J 44/00–02; A23P 30/00–25;
(Continued)

(56) References Cited

U.S. PATENT DOCUMENTS

2005/0000959 A1* 1/2005 Kagan ...................... H05B 6/04
219/660
2009/0289054 A1* 11/2009 Williams ............. H05B 6/1209
219/624

(Continued)

FOREIGN PATENT DOCUMENTS

DE  10214220954 A1  4/2016
DE  102015205711 A1  10/2016
(Continued)

*Primary Examiner* — Michael A Laflame, Jr.
(74) *Attorney, Agent, or Firm* — Laurence A. Greenberg; Werner H. Stemer; Ralph E. Locher

(57) ABSTRACT

A system for producing a cooked food item or foodstuff includes a printing chamber having a mobile printhead for extruding a printing mass, and a cooking chamber having a device for cooking the printing mass. A mobile tray can be moved between printing chamber and cooking chamber by a movement mechanism. A control unit is configured to permit the mobile tray to be disposed below the printhead for generating a spatial configuration of the printing mass in the printing chamber, and to actuate the printhead for generating a spatial configuration of the printing mass on the tray. The control unit is configured to actuate the movement mechanism to transfer the mobile tray with the printing mass into the cooking chamber and to actuate the cooking device to produce a cooked food item by cooking the printing mass.

13 Claims, 2 Drawing Sheets

(51) Int. Cl.
  *A23P 30/00* (2016.01)
  *A23P 20/20* (2016.01)
  *A23L 5/10* (2016.01)
  *A23P 30/20* (2016.01)
  *H05B 6/10* (2006.01)
  *H05B 6/12* (2006.01)
  *A23P 20/25* (2016.01)

(52) U.S. Cl.
  CPC ...... *H05B 6/1209* (2013.01); *A23P 2020/253* (2016.08); *A23V 2002/00* (2013.01)

(58) Field of Classification Search
  CPC .. H05B 1/0258–0263; H05B 6/06–065; H05B 6/12–1209
  See application file for complete search history.

(56) References Cited

U.S. PATENT DOCUMENTS

| | | | |
|---|---|---|---|
| 2011/0236552 A1* | 9/2011 | Vink | A21B 7/00 426/553 |
| 2012/0328747 A1 | 12/2012 | Levy | |
| 2017/0303578 A1 | 10/2017 | Schuessler | |

FOREIGN PATENT DOCUMENTS

| | | | |
|---|---|---|---|
| EP | 2364593 A1 | 9/2011 | |
| WO | 2014190217 A1 | 11/2014 | |
| WO | 2016053681 A1 | 4/2016 | |
| WO | 2016059023 A1 | 4/2016 | |

* cited by examiner

SYSTEM FOR PRINTING AND COOKING A FOOD ITEM

BACKGROUND OF THE INVENTION

Field of the Invention

The invention relates to a system, in particular a household appliance, for printing and cooking a food item.

Food item printers can be used to produce a spatial arrangement of printing mass from an edible printing mass. The spatial arrangement of printing mass can then be cooked in a separate cooking unit, in particular in a separate oven, in order to provide an individualized, cooked food item.

The present document concerns the technical object of providing a system, with which it is possible to simplify and speed up the production of an individualized cooked food item.

SUMMARY OF THE INVENTION

The object is achieved by the subject matter of the independent claim. Optional advantageous embodiments are defined, in particular, in the dependent claims, described in the description below or represented in the figures of the accompanying drawing.

According to one aspect of the invention, a system for producing a cooked food item is described. The system can be embodied as a household appliance or a home appliance, which can be placed on a work surface in a kitchen, for instance, and/or integrated into a built-in cupboard. In particular, the system can have dimensions (e.g. edges of 50 cm long or less), which enable it to be used as a household appliance.

The system comprises a printing chamber with a mobile printhead for the extrusion of a printing mass, and a cooking chamber with means for cooking the printing mass. The chambers can be arranged within a housing of the system. In particular, the chambers can be formed at least partially by walls of a housing of the system. The printing chamber can be used to print a food item, and the cooking chamber can be used for cooking a food item.

The system further comprises a mobile tray, which can be moved between the printing chamber (i.e. a first position) and the cooking chamber (i.e. a second position) by means of a movement mechanism. The tray can form a wall of the printing chamber and/or the cooking chamber particularly when the tray is disposed in or adjacent to the printing chamber (i.e. in the first position). In order to move the tray, the system can comprise a guide rail which runs between the printing chamber and the cooking chamber, along which the mobile tray can be moved between the printing chamber and the cooking chamber by means of the movement mechanism. An efficient and precise movement of the tray can therefore be enabled.

The system further comprises a control unit, which is configured to trigger the mobile tray to be arranged in the printing chamber and/or below the printhead (i.e. in the first position) in order for a spatial arrangement of printing mass to be generated. Moreover, the control unit is configured to activate the printhead in order to produce a spatial arrangement of printing mass on the tray. In particular, printing mass can (e.g. according to a recipe) be extruded from one or more nozzles of the printhead and set down onto the tray so that a spatial arrangement of printing mass is produced.

The control unit is further configured to activate the movement mechanism so as to transfer the mobile tray with the spatial arrangement of printing mass into the cooking chamber (i.e. in the second position). In other words, the tray can be transferred from the first position (for producing a spatial arrangement of printing mass) into the second position (for cooking the spatial arrangement of printing mass). Moreover, the control unit is configured to activate the means for cooking in order to produce a cooked food item by cooking the spatial arrangement of printing mass.

The system therefore allows for the convenient and reliable production of individually printed and cooked food items. In particular, for this purpose the system comprises a mobile tray, on which the food item can be printed and cooked, and by means of which the food item can be automatically transferred from a printing chamber for printing the food item to a cooking chamber for cooking the food item.

The printing chamber can be arranged spatially above the cooking chamber. In other words, the cooking chamber can be arranged in a lower part of the system and the printing chamber can be arranged in an upper part of the system above the cooking chamber. The movement mechanism can be configured to lower the tray, in order to transfer the mobile tray from the printing chamber (i.e. from the first position) into the cooking chamber (i.e. into the second position), or to raise the tray, in order to transfer the mobile tray from the cooking chamber (i.e. from the second position) into the printing chamber (i.e. into the first position). By arranging the chambers one above the other, a particularly compact system can be provided for producing a cooked food item.

The control unit can be configured to transfer the mobile tray, once a cooking process within the cooking chamber is complete, from the cooking chamber (i.e. from the second position) into the printing chamber (i.e. into the first position), in order to make the cooked food item accessible to a user of the system. It is therefore possible to dispense with a dedicated access (e.g. via a flap) to the cooking chamber, as a result of which the thermal insulation of the cooking chamber is improved. Furthermore, it is possible for a user to remove the cooked food item from the relatively cool printing chamber and not from a potentially hot cooking chamber in a convenient and non-critical manner.

The system can comprise one or more doors, with which the cooking chamber can be cut off, in particular thermally insulated, from the printing chamber. The control unit can be configured to trigger the one or more doors to be closed in order to cut off the cooking chamber from the printing chamber when the mobile tray is transferred into the cooking chamber or once the mobile tray has been transferred into the cooking chamber. The provision of one or more closeable doors can ensure reliable cooking within the cooking chamber (since in particular it is possible to prevent heat from escaping from the cooking chamber). Furthermore, contamination on and/or impairments to the printhead and/or the printing chamber on account of the cooking process can be avoided by one or more closeable doors.

The tray can be designed such that it cuts off, in particular thermally insulates, the printing chamber from the cooking chamber when the tray is arranged in the printing chamber and/or below the printhead (i.e. in the first position). A wall of the cooking chamber can therefore be formed by the tray, when the tray is in the first position. The control unit can be configured to activate one or more of the means for cooking in order to preheat the cooking chamber when the mobile tray is arranged in the printing chamber and/or below the printhead (i.e. in the first position) in order for the spatial arrangement of printing mass to be generated. In particular, the boundary between the printing chamber and cooking chamber and the formation of a closed cooking chamber by means of the tray allows the cooking chamber to be pre-heated as early as during the printing process, as a result of which the subsequent cooking process can be shortened. A correspondingly embodied tray therefore allows the cooked food item to be produced more quickly.

The means for cooking can comprise ferromagnetic material in or on the tray. Furthermore, the means for cooking can comprise an induction coil, which is designed such that it can heat the ferromagnetic material by generating a magnetic field when the tray is disposed within the cooking chamber (i.e. in the second position) for a cooking process. The use of induced heat in or on the tray allows a food item to be cooked in a particularly efficient manner. In particular, a broiled food item can be produced in this way.

Alternatively or in addition, the means for cooking can comprise one or more heating elements, which are configured to heat the cooking chamber and/or printing mass by means of convection (e.g. by heating the atmosphere within the cooking chamber) and/or by means of irradiation (e.g. by microwaves). A baked and/or otherwise heated food item can therefore be provided.

The printhead can comprise one or more printing mass containers with in each case at least one nozzle, by means of which printing mass can be extruded from the respective printing mass container onto the tray. Complex food items (e.g. with layers of different printing masses) can be produced as a result of the provision of a number of printing mass containers.

The printhead can comprise at least one temperature adjustment unit (e.g. a heater and/or cooler) for at least one printing mass container and/or for at least one nozzle, with which the temperature in the printing mass in the printing mass container and/or in the nozzle can be adjusted in order to change flow characteristics of the printing mass. By temperature adjustment of the printing mass, it is possible to ensure a precise production of food items.

The system can comprise a guide module, with which the printhead can be moved over the mobile tray at least within one plane (e.g. in an X/Y plane parallel to the tray, at a specific distance Z from the tray). The control unit can be configured to activate the guide module and/or the movement mechanism in order to generate the spatial arrangement of printing mass on the mobile tray.

The control unit can in particular be configured to activate the movement mechanism of the tray, to change a distance between the tray and the printhead, in order to apply printing mass to the spatial arrangement of printing mass in layers. Different layers can be applied to the arrangement of printing mass in a precise manner by adjusting the distance during the printing process. In doing this a movement of the tray is advantageous, since a cost-effective and installation space-efficient printhead can be used, which cannot be moved in the Z direction. In other words, the distance between the printhead and the tray can be adjusted (possibly exclusively) by moving the tray.

It should be noted that any aspects of the system described in this document can be combined with one another in a wide variety of ways. In particular, the features of the claims can be combined with one another in a variety of ways.

BRIEF DESCRIPTION OF THE SEVERAL VIEWS OF THE DRAWING

The invention will now be described in greater detail making reference to the exemplary embodiments illustrated in the drawings. In the drawings.

DESCRIPTION OF THE INVENTION

Figure 1:
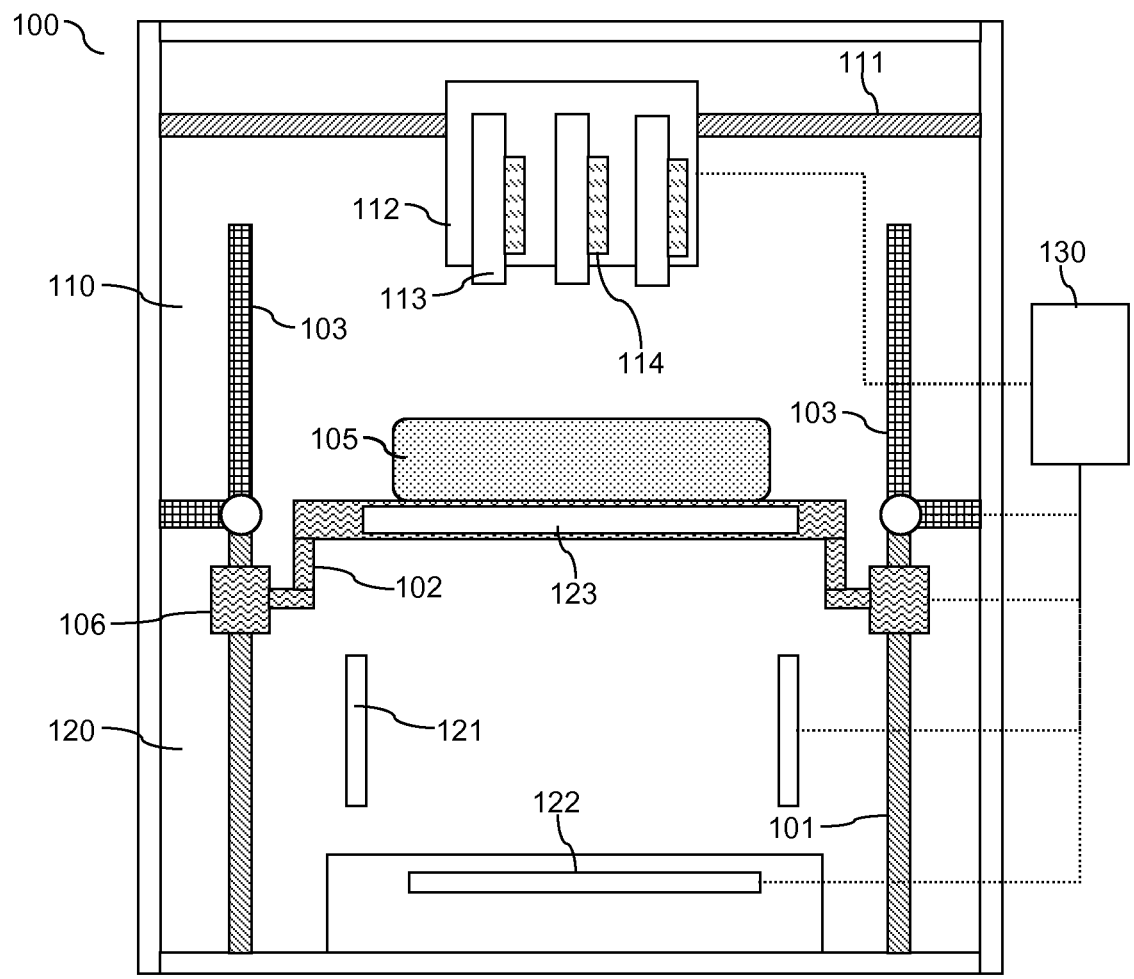
FIG. 1 shows a block diagram of a system for producing a food item in a printed state.

As stated in the introduction, the present document is concerned with the convenient production of individualized, cooked food items. In this context, FIG. 1 shows a system 100 for producing a food item, which has a mobile tray 102, with which a spatial arrangement of printing mass for a food item 105 can be transferred from a printing chamber 110 into a cooking chamber 120, in order to cook the food item 105. Furthermore, after the cooking process is complete, a finished, cooked food item 105 can again be transferred out of the cooking chamber 120 into the printing chamber 110 by means of the mobile tray 102 in order to allow for a convenient removal of the cooked food item 105. A food item 105 can therefore be printed, cooked and provided within a single system and within a single appliance 100 in a convenient and individualized manner.

In the example shown in FIG. 1, the printing chamber 110 (for the printing of a spatial arrangement of printing mass) is arranged above or over the cooking chamber 120. The mobile tray 102 can be moved along one or more guide rails 101 from the printing chamber 110 above into the cooking chamber 120 below. For this purpose the mobile tray 102 can be guided with a movement mechanism 106 (e.g. with a toothed wheel driven by a motor) along the one or more guide rails 101.

The printing chamber 110 comprises a printhead 112 with one or more nozzles 113, wherein one type of printing mass can be extruded onto the tray 102 by means of each nozzle 113 in order to generate a spatial arrangement of printing mass. A nozzle 113 can have means 114, with which the flow characteristics of the respective printing mass can be influenced. For instance, the means 114 can comprise a temperature adjustment unit, in particular a heating and/or cooling unit, for adjusting the temperature of the printing mass to be extruded.

The printhead 112 can be moved with a guide module 111 to different positions above the tray 102, in order to be able to extrude printing mass at different positions. In particular, the printhead 112 can be moved in the X and Y direction within one plane (at the same distance from the tray 102). Furthermore, the printhead 112 can possibly be moved in the Z direction, in order to change the distance between the printhead 112 and tray 102.

The printhead 112 and the guide module 111 can be activated by way of a control unit 130 of the system 100 in order to move the printhead 112 and extrude printing mass. In doing so the printhead 112 and the guide module 111 can be activated according to a recipe, wherein the recipe specifies the form of the spatial arrangement of printing mass to be produced and the positions, quantities and types of the one or more printing masses to be extruded. Thus a spatial arrangement of printing mass can be reliably generated within the printing chamber 110.

Figure 2:
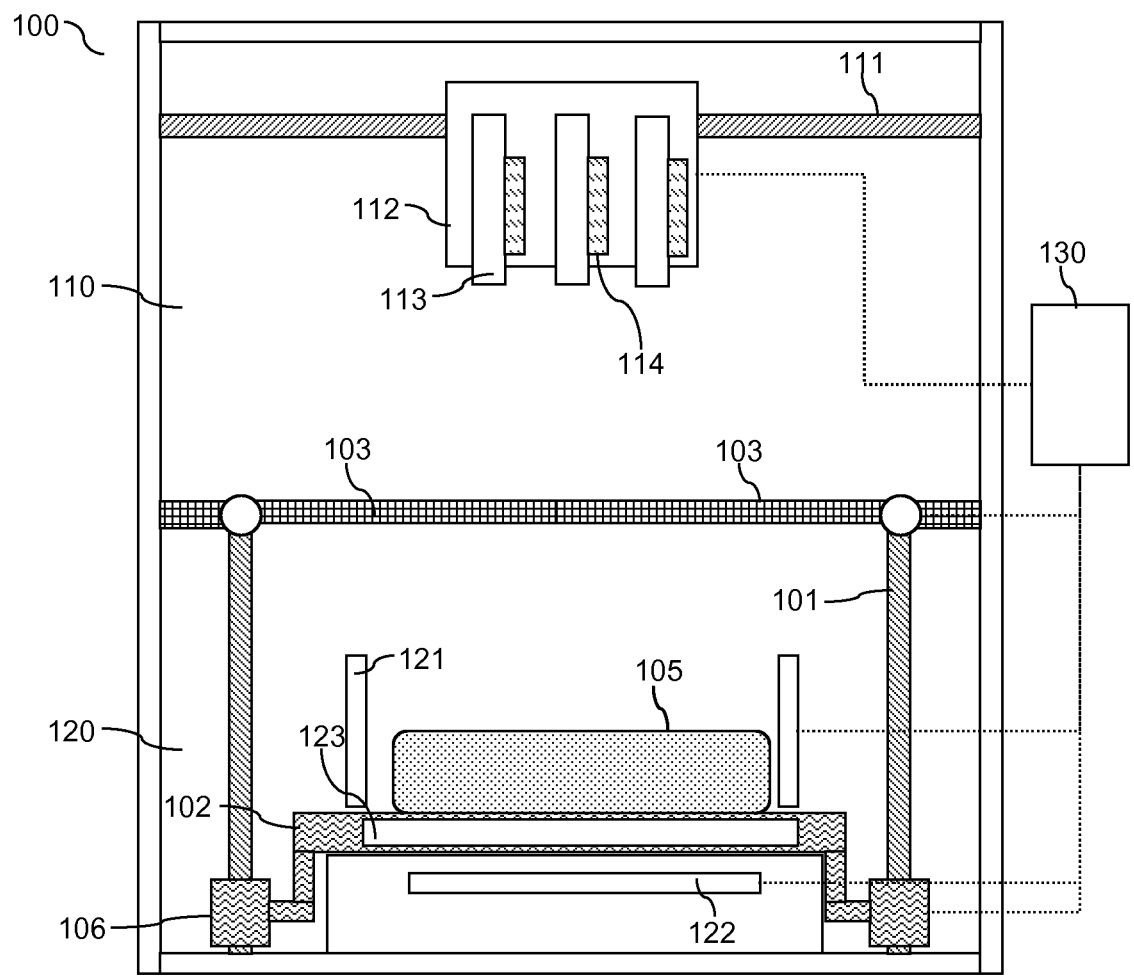
FIG. 2 shows a block diagram of a system for producing a food item in a cooking state.

After the spatial arrangement of printing mass is complete, the movement mechanism 106 can be activated by the control unit 130 in order to move (e.g. lower) the tray 102 from the printing chamber 110 (i.e. from a first position shown in FIG. 1) into the cooking chamber 120 (i.e. into a second position shown in FIG. 2). FIG. 2 shows the state of the system 100 when the tray 102 is disposed in the cooking chamber 120 (i.e. in the second position) for a cooking process. For the cooking process the cooking chamber 120 can be closed toward the printing chamber 110 by means of closeable doors 103. A reliable thermal insulation can therefore be provided between the cooking chamber 120 and printing chamber 110. Furthermore, contamination on or impairments to the printing chamber 110 as a result of the cooking process can be avoided by means of the doors 103. The opening or closing of the doors 103 can be triggered by the control unit 130.

The cooking chamber 120 has one or more means 121, 122, 123 for cooking the spatial arrangement of printing mass. The means 121, 122, 123 for cooking can comprise an induction coil 122, for instance, with which ferromagnetic material 123 in or on the tray 102 can be heated, in order to warm or heat and therefore cook the spatial arrangement of printing mass from below. Furthermore, the means 121, 122, 123 for cooking can comprise one or more heating devices 121 (e.g. to the side of the spatial arrangement of printing mass), e.g. in order to heat the cooking chamber 120 and in order therefore to process the spatial arrangement of printing mass to form a cooked food item 105. The means 121, 122, 123 for cooking can be activated by the control unit 130 (in particular according to a recipe which describes the parameters of the cooking process).

A system 100 (and in particular a household appliance) can therefore be provided, which can print and cook a food item 105 autonomously. In particular, the food item 105 can be effectively and autonomously conveyed by a mobile tray from a printing chamber 110 of the system 100 into a cooking chamber 120 of the system 100 (and vice versa). The convenience and the time required to produce a food item 105 can therefore be reduced. Furthermore, the amount of space required can be reduced by integrating the printing chamber 110 and cooking chamber 120 into a single system 100 (with a single housing). This applies in particular if the printing chamber 110 and cooking chamber 120 are arranged one above the other.

For instance, the system can have a housing with four side walls, a base area and a ceiling area. The cooking chamber 120 and the printing chamber 110 can be formed by in each case different regions of the four side walls of the housing of the system. Furthermore, the printing chamber 110 can be delimited by the ceiling area of the housing of the system. The cooking chamber 120 can in turn be delimited by the base area of the housing of the system. Depending on the position of the tray 102, a separation between the cooking chamber 120 and the printing chamber 110 can be effected by the tray 102 itself or by the one or more closeable doors 103.

The mobile tray 102 can therefore be designed such that in the printed state of the system 100 the mobile tray separates the printing chamber 110 from the cooking chamber 120. The cooking chamber 120 can therefore be preheated as early as during the printing process, as a result of which the time required to produce a food item 105 can be reduced.

The present invention is not restricted to the exemplary embodiments shown. In particular, it should be noted that the description and the figures are only intended to illustrate the principle of the proposed system.

The invention claimed is:

1. A system for producing a cooked food item, the system comprising:
   a printing chamber having a mobile printhead for extruding a printing mass;
   a cooking chamber disposed spatially below said printing chamber, said cooking chamber having a heater for cooking the printing mass;
   a mobile tray;
   a drive for moving said mobile tray between said printing chamber and said cooking chamber, said drive configured to lower said mobile tray to transfer said mobile tray from said printing chamber into said cooking chamber; and
   a control unit configured:
      to place said mobile tray in said printing chamber below said printhead for generating a spatial configuration of the printing mass;
      to activate said printhead for generating a spatial configuration of the printing mass on said tray;
      to activate said drive for transferring said mobile tray with the spatial configuration of the printing mass into said cooking chamber; and
      to activate said heater to produce a cooked food item by cooking the spatial configuration of the printing mass.

2. The system according to claim 1, wherein said control unit is configured to transfer said mobile tray, once a cooking process within said cooking chamber is complete, from said cooking chamber into said printing chamber, to make the cooked food item accessible to a user of the system.

3. The system according to claim 1, which further comprises:
   at least one door for cutting-off or thermally insulating said cooking chamber from said printing chamber;
   said control unit being configured to close said at least one door to cut-off said cooking chamber from said printing chamber when said mobile tray is or has been transferred into said cooking chamber.

4. A system for producing a cooked food item, the system comprising:
   a printing chamber having a mobile printhead for extruding a printing mass;
   a cooking chamber having a heater for cooking the printing mass;
   a mobile tray configured to cut-off or thermally insulate said printing chamber from said cooking chamber when said tray is disposed in said printing chamber below said printhead;
   a drive for moving said mobile tray between said printing chamber and said cooking chamber; and
   a control unit configured:
      to place said mobile tray in said printing chamber below said printhead for generating a spatial configuration of the printing mass;
      to activate said printhead for generating a spatial configuration of the printing mass on said tray;
      to activate said drive for transferring said mobile tray with the spatial configuration of the printing mass into said cooking chamber; and
      to activate said heater to produce a cooked food item by cooking the spatial configuration of the printing mass.

5. The system according to claim 4, wherein said control unit is configured to activate said heater to preheat said cooking chamber when said mobile tray is disposed in said printing chamber below said printhead for generating the spatial configuration of the printing mass.

6. The system according to claim 1, wherein said heater includes:
   ferromagnetic material disposed in or on said tray; and an induction coil configured to heat said ferromagnetic material by generating a magnetic field when said tray is disposed within said cooking chamber for a cooking process.

7. The system according to claim 1, wherein said heater includes at least one heating element for heating at least one of said cooking chamber or the printing mass by at least one of convection or irradiation.

8. The system according to claim 1, wherein said printhead includes at least one printing mass container with at least one respective nozzle for extruding the printing mass onto said tray.

9. The system according to claim 8, wherein said printhead includes at least one temperature regulating unit for at least one of said at least one printing mass container or said at least one nozzle for regulating a temperature of the printing mass in at least one of said printing mass container or said nozzle to change flow characteristics of the printing mass.

10. A system for producing a cooked food item, the system comprising:
    a printing chamber having a mobile printhead for extruding a printing mass;
    a cooking chamber having a heater for cooking the printing mass;
    a mobile tray;
    a guide module for moving said printhead over said mobile tray at least within one plane;
    a drive for moving said mobile tray between said printing chamber and said cooking chamber;
    a control unit configured:
        to place said mobile tray in said printing chamber below said printhead for generating a spatial configuration of the printing mass;
        to activate said printhead for generating a spatial configuration of the printing mass on said tray;
        to activate said drive for transferring said mobile tray with the spatial configuration of the printing mass into said cooking chamber;
        to activate said heater to produce a cooked food item by cooking the spatial configuration of the printing mass; and
        to activate at least one of said guide module or said drive to generate the spatial configuration of the printing mass on said mobile tray.

11. The system according to claim 10, wherein said control unit is configured to activate said drive of said tray for changing a distance between said tray and said printhead to apply the printing mass to the spatial configuration of the printing mass in layers.

12. A system for producing a cooked food item, the system comprising:
    a printing chamber having a mobile printhead for extruding a printing mass;
    a cooking chamber having a heater for cooking the printing mass;
    a mobile tray;
    a guide rail extended between said printing chamber and said cooking chamber;
    a drive for moving said mobile tray between said printing chamber and said cooking chamber, said drive being configured to move said mobile tray along said guide rail between said printing chamber and said cooking chamber; and
    a control unit configured:
        to place said mobile tray in said printing chamber below said printhead for generating a spatial configuration of the printing mass;
        to activate said printhead for generating a spatial configuration of the printing mass on said tray;
        to activate said drive for transferring said mobile tray with the spatial configuration of the printing mass into said cooking chamber; and
        to activate said heater to produce a cooked food item by cooking the spatial configuration of the printing mass.

13. The system according to claim 1, wherein the system is a household appliance to be at least one of placed on a work surface in a kitchen or integrated into a built-in cabinet in a kitchen.

* * * * *